United States Patent [19]

Van Dusen et al.

[11] Patent Number: 5,469,998
[45] Date of Patent: Nov. 28, 1995

[54] SPARE TIRE CARRIER FOR A TOW HITCH

[75] Inventors: Donn S. Van Dusen, Loma Rica; Douglas P. Gibbs, Yuba City, both of Calif.

[73] Assignee: Mascotech Accessories, Inc., Sacramento, Calif.

[ * ] Notice: The term of this patent shall not extend beyond the expiration dat of Pat. No. 5,449,101.

[21] Appl. No.: 373,486

[22] Filed: Jan. 17, 1995

Related U.S. Application Data

[63] Continuation of Ser. No. 144,760, Oct. 28, 1993, abandoned.

[51] Int. Cl.[6] .................................................. B62D 43/02
[52] U.S. Cl. .................. 224/506; 224/507; 224/508; 224/521; 224/532; 224/535; 224/42.21
[58] Field of Search .................. 224/42.45 R, 42.21, 224/42.03 B, 42.03 A, 42.01, 42.07, 42.08, 42.06, 42.44, 324; 280/506, 415.1, 416.1, 416.3, 504, 507

[56] References Cited

U.S. PATENT DOCUMENTS

| | | | |
|---|---|---|---|
| 3,613,971 | 10/1971 | Betz | 224/42.21 |
| 4,046,398 | 9/1977 | Dunwoody | 280/415.1 |
| 4,140,255 | 2/1979 | Weiler | 224/42.06 |
| 4,561,575 | 12/1985 | Jones | 224/42.21 |
| 5,085,360 | 4/1992 | Fortune et al. | 224/42.13 |
| 5,190,195 | 3/1993 | Fullhart | 224/42.45 R |
| 5,303,857 | 4/1994 | Hewson | 224/42.21 |

*Primary Examiner*—Henry J. Recla
*Assistant Examiner*—Steven O. Douglas
*Attorney, Agent, or Firm*—Hohbach, Test, Albritton & Herbert Flehr

[57] ABSTRACT

The present invention relates to a tire carrier for an automotive vehicle and, more particularly, to a hitch mounted tire carrier. The invention includes a cantilever construction having the combination of an elongated arm having the tire mount structure, and a bracket for the arm connectable, for example, to a tow hitch of a vehicle. The arm is movable relative to the bracket between the transportation position and in inactive position, and a cinch is provided on the bracket for normally maintaining the arm in the transportation position but releasing the same for movement to the inactive position. The cinch has a lever latch which, in keeping with the invention, is manipulatable of the cinch to an over-center position. A tightener is provided as a protuberance on the lever latch which is mounted for pivoting to a stop position beyond a center position at which it would be generally orthogonal to a bearing surface it engages. The combination also preferably includes a coupler having a drawbar and a tightener designed to maintain intimate contact between a surface of the drawbar and a surface of the tow hitch irrespective of vehicle movement.

21 Claims, 5 Drawing Sheets

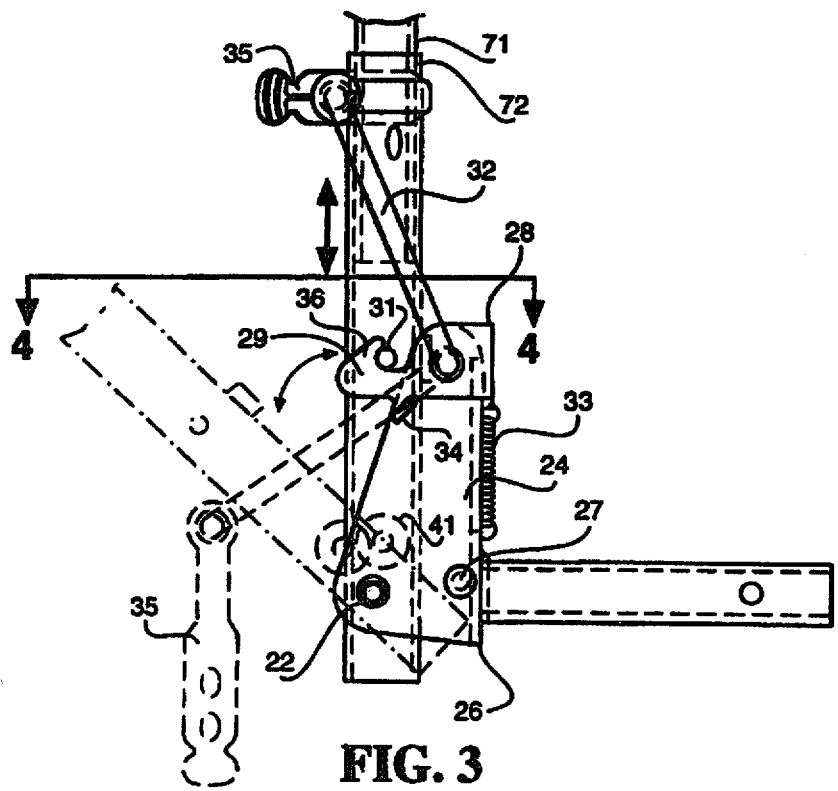
FIG. 3
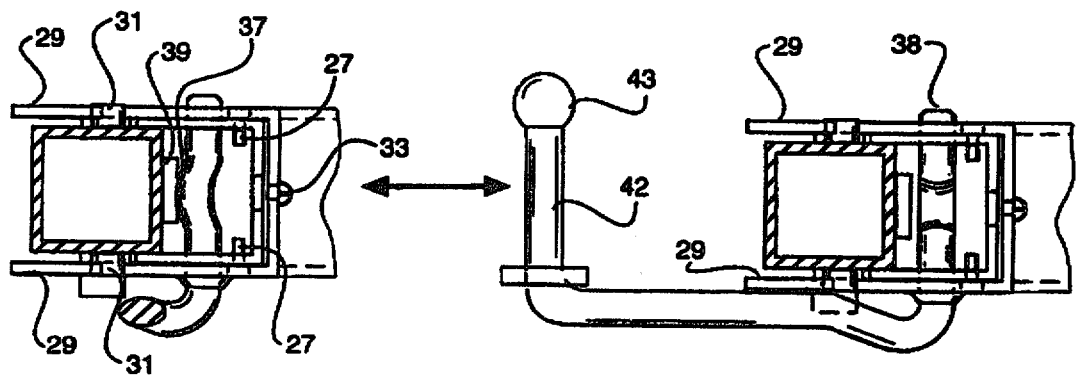
FIG. 4A       FIG. 4B
FIG. 4C

SPARE TIRE CARRIER FOR A TOW HITCH

This is a continuation of application Ser. No. 08/144,760, now abandoned, filed Oct. 28, 1993.

BACKGROUND OF THE INVENTION

The present invention relates to a tire carrier for an automotive vehicle and, more particularly, to a hitch mounted tire carrier.

Most automotive vehicles carry a spare tire. This spare tire sometimes is carried within the interior of the vehicle. Because such an arrangement results in the spare taking up interior space, it is desirable in many situations to have the spare tire mounted on the exterior of the vehicle. This is particularly true with respect to recreational and sporting vehicles since interior space is often at a premium.

Several different designs of exterior tire mounts have been used in the past. One of the more common used today is the so-called "swing-away" arrangement for mounting the tire at the rear of a vehicle. Such an arrangement typically includes a significant frame having trusses to which the tire mounting plate is secured. The frame is pivotally secured to the side of the vehicle rear so that the arrangement can be swung away to enable access to the rear of the vehicle, such as to a door or gate.

A difficulty with swing-away arrangements is that because of the pivoting such an arrangement generally is not completely stable, i.e., has play. Because of such and the cantilevered weight represented by a swing-away tire mount, some even include a relatively complicated structure for securing the mount in the transportation position, i.e., when it is not being swung away. The result of the play and the cantilevering is that a complex and expensive arrangement is provided. Other exterior tire mounts have been designed for the stowing of a spare tire underneath a vehicle. Use of the same reduces vehicle clearance, of course, and some of such arrangements provide relatively complicated access to the tire.

SUMMARY OF THE INVENTION

The present invention relates to a tire carrier which is hitch mounted. That is, it makes use of, and provides securance to, a tow hitch receiver of the type now commonly used. In its broad aspects, the invention includes a construction having the combination of an elongated arm having the tire mount structure, and a bracket for the arm connectable, for example, to a tow hitch of a vehicle. The arm is movable relative to the bracket between the transportation position and an inactive position, and a cinch is provided on the bracket for normally maintaining the arm in the transportation position but releasing the same for movement to the inactive position. The cinch has a lever latch which, in keeping with the invention, is manipulatable of the cinch to an over-center position. That is, the cinch has besides the normal catching elements, a latch which is manipulatable to an over-center position to tighten the remainder of such cinch even though a relatively loose normal cinch arrangement is provided for easy latching of the arm in the transportation position.

A tightener most simply is provided as a protuberance on the lever latch which is mounted for pivoting to a stop position beyond a center position at which it would be generally orthogonal to a bearing surface it engages. It should be noted that although in the preferred embodiment the protuberance is part of the lever latch, from the broad standpoint it could be a portion of any other part of the cinch. Moreover, although it is stated that the tire mount structure is on the elongated arm, it may be indirectly on the same. That is, there are many different arrangements of carrier constructions, and it is not necessary that the tire mount be directly on the arm or other structure which is responsible for the cantilever.

The lever latch is positioned and configured for actuation by a foot of a user to release the same while maintaining the user's hands free. Such lever latch most desirably includes a foot engagement bar which also acts as an obstruction to stop the tire mount structure via the arm from moving beyond a set release position.

The combination also preferably includes a coupler having a drawbar and a tightener designed to maintain intimate contact between a surface of the drawbar and a surface of the tow hitch irrespective of vehicle movement. More particularly, the tightener applies appropriate opposing forces to overlapping surfaces of the drawbar and tow hitch so that the drawbar is tightened against one side wall of the tow hitch.

The arm of the cantilever construction is made up of two elongated parts, one of which telescopes within the other to change the effective distance that the cantilever holds the tire mount from the coupler.

Other features and advantages of the invention either will become apparent or will be described in connection with the following, more detailed description of a preferred embodiment of the invention.

BRIEF DESCRIPTION OF THE DRAWING

With reference to the accompanying drawing:

FIG. 3 is an enlarged broken-away side elevation view of the cinch arrangement of the instant invention;

FIGS. 4A–4C are sectional views taken on a plane indicated by the lines 4—4 in FIG. 3, illustrating the over-center portion of the cinch and the relationship of the lever to the remainder of the carrier of the preferred embodiment;

DETAILED DESCRIPTION OF THE PREFERRED EMBODIMENTS

The following relatively detailed description is provided to satisfy the patent statutes. However, it will be appreciated by those skilled in the art that various changes and modifications can be made without departing from the invention.

Figure 1:
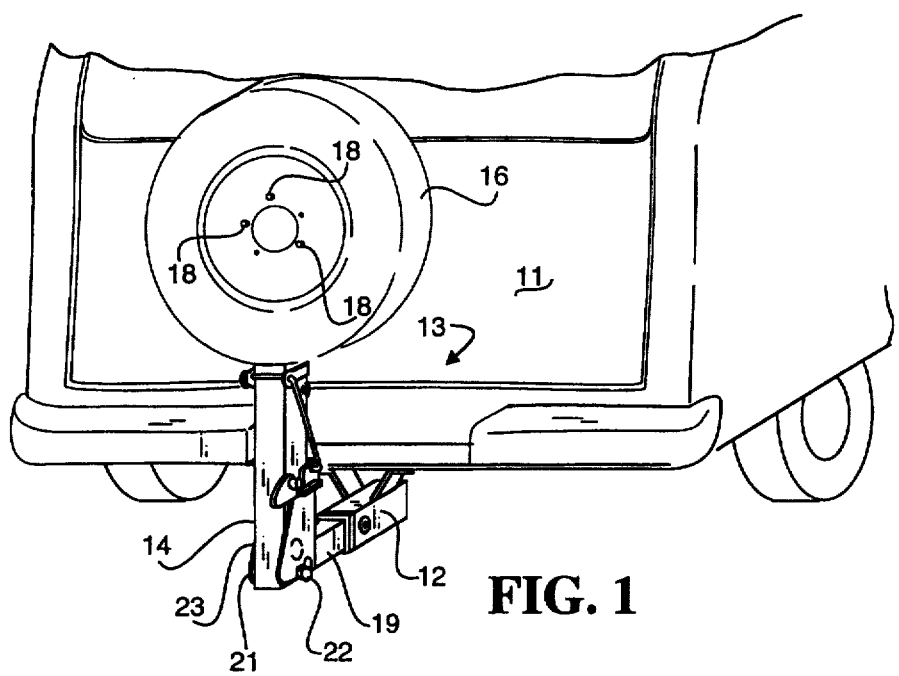
FIG. 1 is a broken-away isometric rear view of a vehicle illustrating a preferred embodiment of the spare tire carrier of the invention secured to a tow hitch of the vehicle.

The rear end 11 of an automotive vehicle is illustrated in FIG. 1, with a standard tow hitch receiver construction 12 depending therefrom. A spare tire carrier of the invention, generally referred to by the reference numeral 13, is shown in place of the ball or other arrangement typically associated with a tow hitch of this nature. Such carrier includes an elongated arm 14 having at its upper end, a spare tire 16 and standard mounting structure for the same. Such tire mount in this embodiment is simply a plate 17 (FIG. 6) from which bolts 18 project for registration with the standard lug bolt holes in the wheel of the spare tire.

It will be appreciated that with the arrangement described, the spare tire is suspended from the support structure to be parallel to the elongated arm 14 which extends upwardly from the level of the hitch 12. While the invention is particularly useful with a carrier designed to suspend the tire fully, full suspension is not necessary.

Figure 2A:
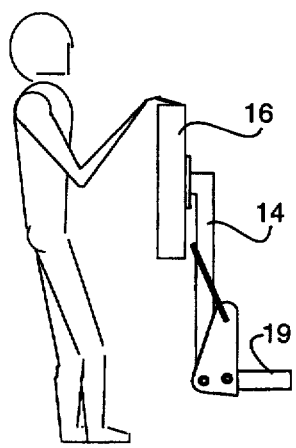
FIGS. 2A–2C are schematic side elevation views of the carrier illustrating operation of the same by a user.
Figure 2B:
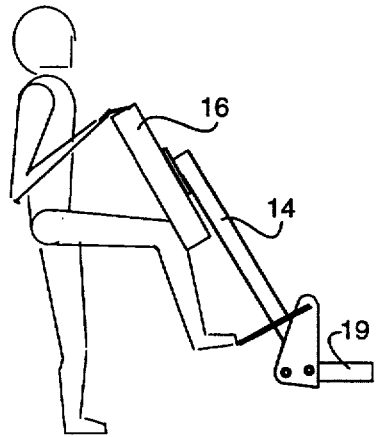
Figure 2C:
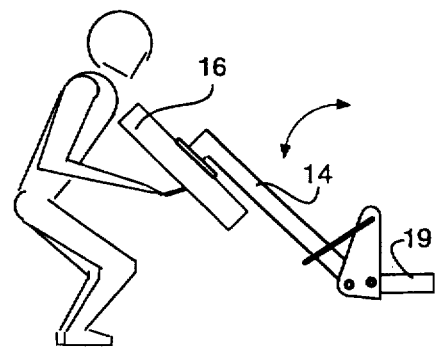

FIGS. 2A through 2C show movement of the tire carrier between a transportation position and an inactive position in which access to a vehicle is provided. The active position shown in FIG. 2A is the transportation position. The inactive (release) position shown in FIG. 2C is one providing access to the rear of the vehicle without the carrier (or the spare tire) needing to be removed from the hitch. It should be noted that if desired the carrier can be placed in this inactive position for the mounting of a spare tire on the same.

A drawbar 19 is provided as part of the carrier to secure it to a vehicle. As will be discussed hereinafter, such securance is designed in the instant arrangement to assure that there is a rigid connection between the carrier and the vehicle tow hitch. Arm 14 is part of a cantilever construction arrangement of the carrier. It is pivotally mounted by pins 21 and 22 between a pair of opposed walls 23 and 24 of a U-shaped bracket 26. The bracket defines a cavity between such walls which receives the arm. Such arm is pivotable between the transportation position and the inactive position defined by stop pins 27.

Bracket 26 includes a cinch to maintain the arm selectively in its transportation position. This cinch includes a spring loaded U-shaped hooking member 28 pivotally mounted on a portion of a lever latch (to be described in more detail hereinafter) 32 which extends between the walls 23 and 24. Hooking member 28 terminates in a pair of hooks 29 which engage associated pins 31 projecting from opposite sides of the arm 14. Such hooking member 28 is spring-loaded in tension by a coil spring 33 connected between a protuberance on the same and the body of the remainder of the bracket. It will be seen that such coil spring normally maintains the hooks 29 in engagement with the respective pins 31 as illustrated in solid in FIG. 3. The lever latch 32, though, is movable downward to a position in which it engages a stop flange 34 on the hooking member to pivot the latter as necessary to release the pins 31 and, hence, the arm 14 for pivoting to the inactive position. Each of the hooks 29 includes a cam surface 36 which is engaged by the pin associated with the hook as the arm is pivoted toward its transportation position. This engagement moves the cinch downward against the spring pressure and permits it to engage the pin.

It will be seen from the above that the pin latch portion of the cinch normally maintains the arm in the transportation position but enables it to be simply released when it is desired to pivot the arm 14 and mount (with or without a tire on the same) to the inactive position.

It is movement of the lever latch 32 from the home locking position shown in solid in FIG. 3 to a position just beyond the position shown in phantom which results in release of the pin latch. That is, it will be appreciated that to actually release the pin latch, the lever latch 32 must be moved slightly downward from the position shown so as to coact with the stop flange 34 to move the hooks 29. A rubber strap 35 is included on the end of the lever latch to secure the latch against the arm 14 in the locking position.

Figure 5:
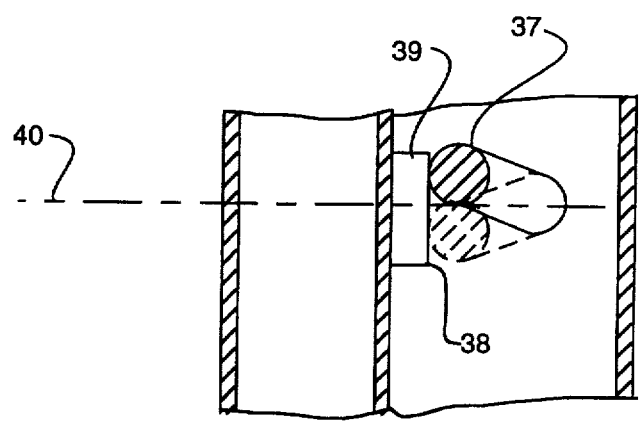
FIG. 5 is an enlarged broken-away sectional view of the over-center portion of the cinch.

Movement of the lever latch 32 to its home position will manipulate the cinch to an over-center position. The portion of the lever arm which extends between the walls 23 and 24 of the bracket, includes a protuberance 37 which engages an exposed surface 38 of a bearing pad 39. This protuberance is so positioned relative to the remainder of the latch 32 that just before the lever latch reaches the locking position it passes beyond a center position on the bearing surface at which it would be generally orthogonal to such bearing surface. This is illustrated in FIG. 5 which shows the lever latch protuberance engaging the bearing surface just before the center, which center is represented by the intersection with such surface of the line 40. It then moves as the lever latch reaches its locked home position, to the over-center position which is illustrated. In such position it acts to apply force to the arm 14 to keep the pins 31 in tight engagement with the respective hooks 29. The cinch thus includes not only a pin latch for providing initial securance of the arm 14 in the desired position, but a tightening arrangement (through the lever latch) which tends to remove any play in such latch. This tightening is automatic, i.e., achieved simply by moving the lever latch to its home locking position.

It should be recognized that the inclusion of the tightening over-center arrangement relieves somewhat the tolerance requirements on the pin latch and, hence, makes use of the same in this type of arrangement realistic. It also will be recognized that although in the preferred embodiment the over-center position is the upper position, the cinch, including the over-center lock, can be modified to have the release position be the upper position and the home locking position be the lower position.

A pair of friction elements are positioned to inhibit initial free movement of the arm 14 upon release of the cinch. Such friction elements simply are a pair of cylindrical plastic shims 41 secured on opposite sides of the arm between such arm and the bracket side walls. These elements provide friction surfaces which engage the bracket as the arm pivots, and tend to inhibit such pivoting. The surface material and the engagement pressure are selected to counteract the weight of the tire mount structure—and any tire on the same. Thus, if the cinch should be unintendedly released, such as by a child, the spare tire carrier (and the tire) will not simply fall. An exertion, although small, must still be applied to the arm to cause pivoting.

The position and shape of the lever latch facilitates foot operation so that a user's hands are free for manipulation of the support structure or for other purposes. That is, the lever latch includes a foot/hand engagement bar 42 which extends generally parallel to the rear of a vehicle when the carrier is connected thereto. Such foot engagement bar includes an end knob 43 which projects outward of all other structure of the carrier adjacent to it to permit access to the lever by a user's foot. It will be appreciated that when the lever is in its locking position illustrated in FIG. 3, it is in close proximity to the arm 14. The portion of the engagement bar represented by knob 43 permits the foot of a user to have the access necessary to initiate the movement of the lever. It should be noted that when the foot engagement bar is released, the lever latch returns against the spring loading to the position shown in phantom in FIG. 3. In such position, the bar acts as an obstruction to prevent further pivoting of the arm 14 should pins 27 fail.

Figure 6:
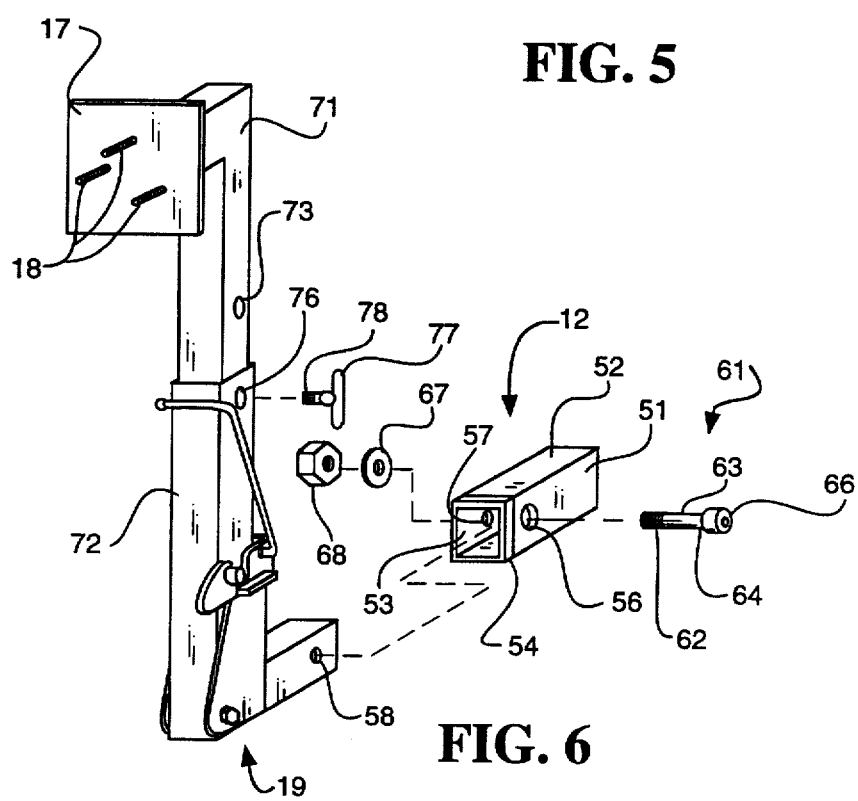
FIG. 6 is an isometric and exploded view illustrating the relationship of the carrier to a tow hitch receiver.

Drawbar 19 is securable to the hitch 12 by an arrangement which assures that it is a rigid construction. FIG. 6 shows an exploded isometric view of this arrangement. Tow hitch receiver 12 has four walls 51, 52, 53, and 54. At least two bolt holes 56 and 57 are located respectively on opposite walls 51 and 53. The tow hitch receiver enables drawbar 19 to interface with the tow hitch by telescoping. In the telescoped position, the walls of the drawbar 19 are located within the walls of the receiver 12 such that at least one bolt hole 58 in the drawbar aligns with receiver bolt hole 56. Typically, two bolt holes on opposite walls of the drawbar align with the two bolt holes 56 and 57 on opposite walls of the receiver.

The bolt hole alignment allows a portion of a tightener 61 to be inserted through the bolt holes to secure the drawbar 19 to the tow hitch receiver 12. The tightener 61, which is cylindrically shaped in this embodiment, comprises a threaded tail 62, a midsection 63, a shoulder 64, and a head 66. A washer 67 and a nut 68 are coaxially coupled and tightened onto the tightener tail 62. (The relationship of the nut 68 and the washer 67 is such that references to the nut includes the washer. However, the washer is not necessarily essential to the performance of the nut 68.)

The diameter of the shoulder 64 is smaller than the diameter of the tow hitch bolt hole 56. The diameter of the shoulder 64, however, is larger than the diameter of a bolt hole 58 in the drawbar. Finally, to allow a portion of the tightener 61 to be inserted into the aligned bolt holes, the diameters of the aligned bolt holes are each larger than the diameters of the tail 62 and midsection 63 of the tightener 61.

Figure 7:
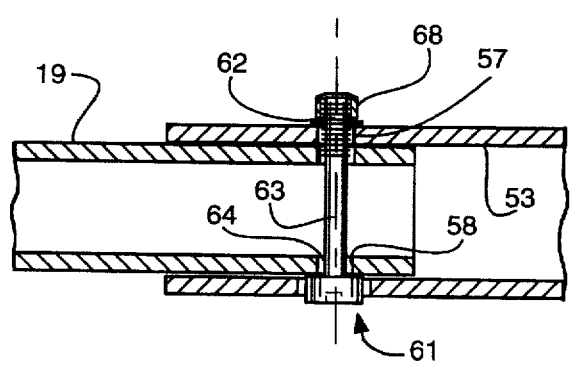
FIG. 7 is a part sectional view illustrating the hitch carrier of the invention secured in position to a tow hitch.

As shown in the top cross sectional view of FIG. 7, nut 68 is tightened around the threaded tail 62 of the tightener 61 and applies a force on the surface it is touching, namely the outer surface of the tow hitch wall 53 containing bolt hole 57. Consequently, the shoulder 64 also applies a force against the surface of the drawbar it is touching, namely the outer surface of the wall containing bolt hole 58.

It will be seen that the hitch connection described above cooperates with the latch arrangement to provide a rigid securance of the carrier to the article. When the carrier is in the position illustrated in FIG. 1, the spare tire blocks the vehicle center high mount stop light (CHMSL) from rear view and impairs the visibility of light emanating from the same. The position of the tire mount plate 17 can be changed to avoid or alleviate blocking. That is, the cantilever bar 14 which extends between the drawbar 19 and such plate is adjustable so as to change the vertical distance that the cantilever holds the article support above the drawbar. It is made up of two parts, an upper bar part 71 and a lower bar part 72. The upper bar part 72 is telescoped within the part 27 for movement between positions. Upper bar part 71 includes a pair of threaded holes spaced along its length (one of such holes, hole 73, being visible in FIG. 6). It will be seen that each of these holes, in turn, can be brought into registration with a comparable hole 76 in bar 72. A threaded thumb bolt 77 has a shank 78 which can extend through hole 76 to be threaded in engagement with either the hole 73 or the hole 74, depending upon which of the latter is in registration with the hole 76. FIG. 6 shows the hole in the upper bar part which is hidden from illustration, in registration therewith.

Figure 8:
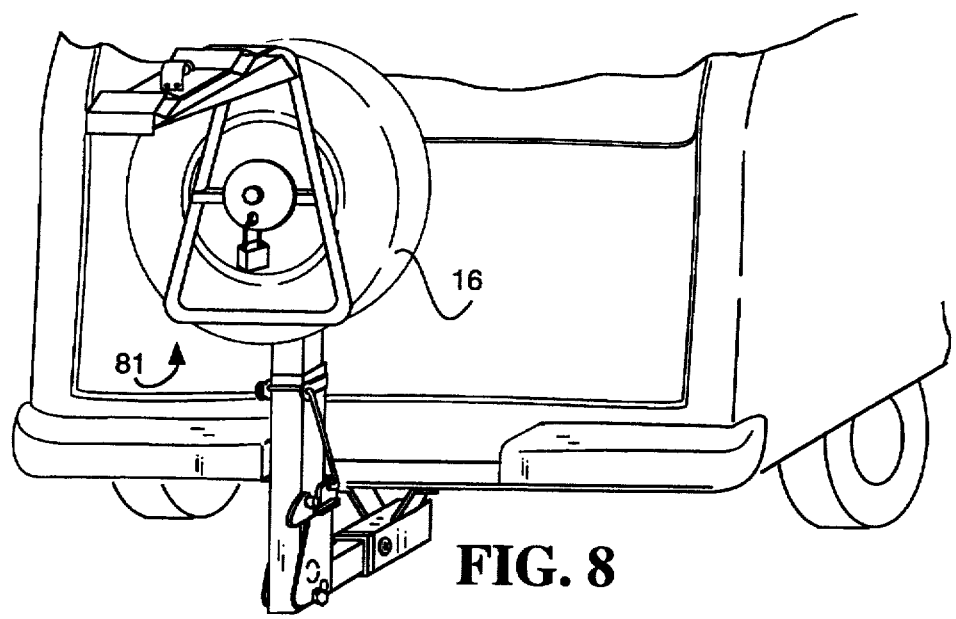
FIG. 8 is a broken-away isometric view similar to FIG. 1, illustrating use of the spare tire carrier of the invention to also carry a rack.
Figure 9:
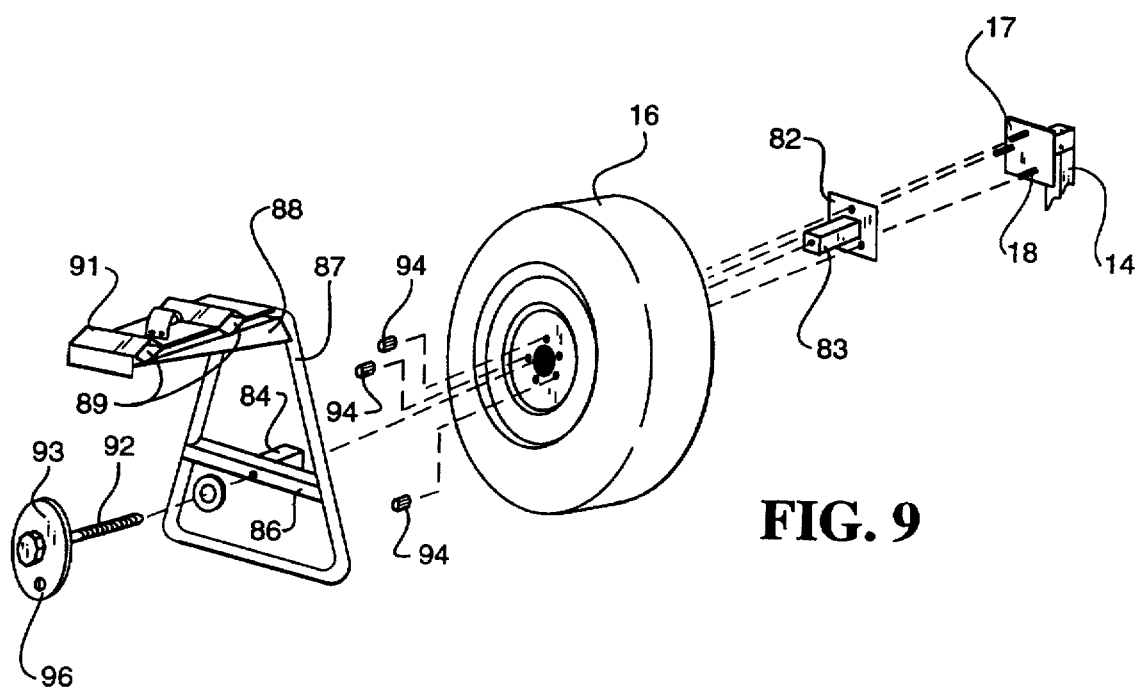
FIG. 9 is an exploded, partial isometric view illustrating the relationship of a rack to the remainder of the carrier.

As mentioned previously, an article support structure can also be combined with the spare tire hitch mount. That is, the rigidity provided by the hitch construction of the invention is usable simultaneously both to secure a spare tire at the exterior of a vehicle and to carry sporting or recreational articles such as bikes. FIGS. 8 and 9 show such an arrangement. A bicycle support, generally referred to by the reference numeral 81, is secured to the carrier through the spare tire 16. That is, a support mounting plate 82 is mounted between the tire mounting plate 17 and the tire. Such support mounting plate 82 has a projecting stub 83 which extends through the axle hole on the spare tire wheel and telescopes within a corresponding tubular receiver 84 adhered by welding to a cross bar 86 of article support structure framework 87. A bicycle mount 88 extends outwardly of framework 87, which bicycle mount includes a pair of grooves 89 that coact with registering channels in a clamp 91 to maintain the frame cross bars of a pair of bicycles on such mount.

A locking arrangement is provided to enable one to prevent unintended removal of the spare tire 16 or the rack 81. That is, a bolt 92 having an enlarged head 93 extends axially through the receiver 84 for threadable receipt interiorly of the stub 83. The bolt 92 thus maintains the rack together and its head 93 covers the lug bolt nuts 94. A hole 96 is provided in the head 93 for the acceptance of a standard padlock. It will be appreciated that the assembled structure then cannot be disassembled, the padlock preventing rotation of the bolt 92 by striking bar 86.

Figure 10:
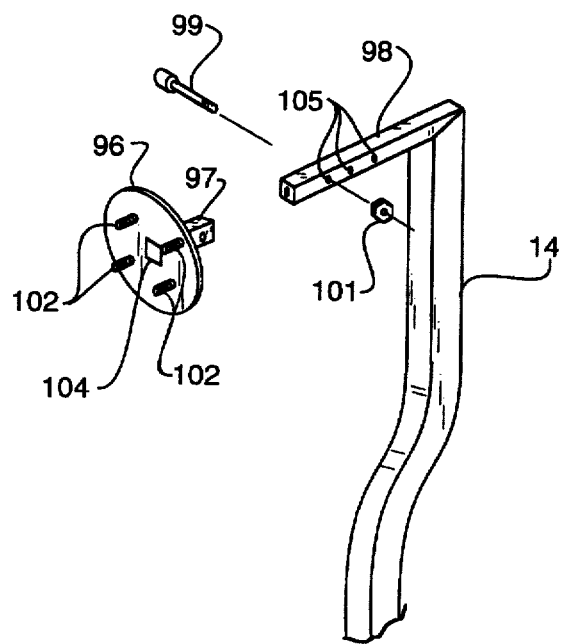
FIG. 10 is an isometric, exploded partial view illustrating a different implementation of the invention.
Figure 11:
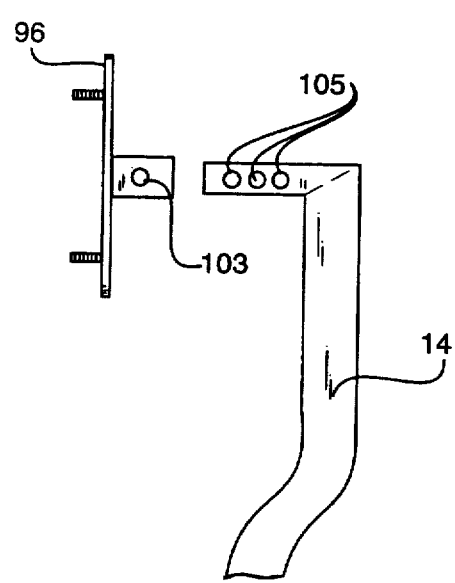
FIG. 11 is an elevation view of the implementation of FIG. 10.

FIGS. 10 and 11 show a preferred modification of the manner in which a tire is mountable to the carrier of the invention. That is, with reference to such figures, an interchangeable tire mounting plate 96 is provided with means for removably securing the same to the arm 14 in place of the tire mounting plate 17 being welded thereto. Such plate includes an axial receiver tube 97 which telescopically receives a stub 98 provided at the end of arm 14. The receiver 97 and, hence, the plate 96 is rigidly secured to the stub with a coupling arrangement of the type described previously for securing the carrier to a hitch receiver. In this connection, a bolt 99 and a nut 101 are illustrated.

It will be appreciated from the above that the spare tire carrier of the invention can be "customized" by using the plate 97 having the appropriate pattern of bolts 102 to interact with the tire. It will also be appreciated that since the plate easily can be removed, use of the same enables one to secure a plate to a tire and then raise the tire in the air (with the plate attached to it) and secure it via the telescoping and coupling arrangement to the remainder of the hitch.

Provision is made in this modification for different tire and wheel sizes. That is, a plurality of bolt holes 105 are provided axially along the stub 98. These holes can be aligned with the bolt hole 103 for the coupling to select an appropriate distance from the rear of a vehicle. Thus differing thicknesses of tires can be accommodated. It should be noted that there is an offset provided in the arm 14 as shown to enable a tire to be close to a vehicle.

If desired, a nut (not shown) can be welded or otherwise rigidly secured within the square aperture 104 in the plate 96. This nut will be accessible through the normal axle hole provided in a tire wheel. Various apparatus can be connected to the carrier via this nut, such as a secondary lock arrangement or the like. Carriers for recreational equipment also can be secured to the carrier. It will be also appreciated that other structure besides the nut can be provided on the plate in the area that is accessible through the spare tire axle hole, to permit other connections.

As mentioned at the beginning of the detailed description, applicants are not limited to the specific embodiments described above. The claims, their equivalents and their equivalent language define the scope of protection.

What is claimed is:

1. In a spare tire carrier having tire mount structure to project from a vehicle having a hitch receiver, for movement between a position for transportation of a tire and an inactive position, the improvement comprising the combination of:

(a) an elongated arm connected to and projecting from said tire mount structure; and (b) a bracket for interacting with said arm as said tire mount structure moves with said arm between said transportation position and said inactive position, said bracket having a cinch to maintain said arm with said tire mount structure selectively in said transportation position, said cinch having a latch for holding said arm when said tire mount structure is in said transportation position and a lever for manipulating said latch to release said arm and said tire mount structure from said transportation position, said arm including a bearing surface having an over-center location thereon, said lever being rotatable about an axis adjacent said arm, said lever further including a protuberance rotatable about an axis between a release position in which said protuberance is on one side of said over-center location on said bearing surface when said lever releases said latch and a locked position in which said protuberance is on the other side of said over-center location at which said protuberance engages said bearing surface, thereby holding said elongated arm and said tire mount structure in said transportation position.

2. The spare tire carrier of claim 1 wherein said bracket defines a cavity which receives said arm.

3. The spare tire carrier of claim 1 wherein said protuberance is part of said lever latch means.

4. The spare tire carrier of claim 1 wherein said cinch also includes a pin latch for maintaining said arm in said transportation position, said pin latch including a pin on one of said arm and bracket which is engageable by a hook on the other of said arm and bracket.

5. The spare tire carrier of claim 4 wherein said hook is pivotally mounted on said bracket and includes a cam surface engageable by a pin on said elongated arm as said arm is brought to said transportation position to pivot said hook and enable the same to engage said pin.

6. The spare tire carrier according to claim 1 wherein said latch is a pin latch for maintaining said arm in said transportation position, said pin latch including a pin on one of said arm and bracket engageable by a hook on the other of said arm and bracket, said hook being pivotally mounted on said bracket and spring loaded to a hooking position, which hook also includes a cam surface engageable by said pin as said arm is brought to said transportation position to pivot said hook from said locking position and enable the same to engage said pin.

7. The spare tire carrier according to claim 1 wherein said vehicle has a hitch receiver and further including a coupler for connecting said spare tire carrier to said hitch receiver, said coupler comprising:

a drawbar having a surface configured to overlap and oppose a surface of said hitch receiver to provide opposed overlapping surfaces; and a tightener which applies force to maintain the overlapping surfaces together.

8. The spare tire carrier of claim 7 wherein the drawbar is configured to telescope within said hitch receiver so that an exterior surface of the drawbar overlaps an interior surface of the hitch receiver to provide the opposed overlapping surfaces.

9. The spare tire carrier of claim 8 wherein the drawbar has at least one bolt hole and the hitch receiver has at least one bolt hole; and the relative locations of the bolt holes are such that when the drawbar is telescoped within the hitch receiver, at least one particular relative telescoped position of the drawbar and hitch receiver exists in which the bolt hole in the receiver is aligned with the bolt hole in the drawbar.

10. The spare tire carrier of claim 9 wherein the diameter of the aligned bolt hole on the drawbar is smaller than the diameter of a corresponding aligned bolt hole on the tow hitch.

11. The spare tire carrier of claim 9 wherein the tightener comprises:

a tail whose diameter is smaller than the diameters of all aligned bolt holes on the drawbar and the hitch receiver;

a midsection located between a shoulder and the tail whose diameter is smaller than the diameters of all aligned bolt holes on the drawbar and the hitch receiver;

a shoulder wherein the shoulder's diameter is larger than that of the midsection; and a head that is attached to the shoulder.

12. The spare tire carrier of claim 11 wherein the tightener further comprises at least one nut coupled and tightened to another section of the tightener such that a force is applied from the nut to the surface it is touching and a force is applied from the shoulder of the tightener to the surface it is touching.

13. The spare tire carrier of claim 12 wherein the nut is a prevailing torque nut.

14. The spare tire carrier of claim 12 wherein the tightener further comprises a specifically-designed groove that communicates with a wrench.

15. The spare tire carrier for an automotive vehicle having a hitch receiver of claim 12 wherein the diameter of the shoulder is larger than the diameter of the aligned bolt hole on the drawbar and smaller than the diameter of the aligned bolt hole on the tow hitch.

16. The spare tire carrier of claim 12 wherein the diameter of the shoulder is smaller than the diameter of the aligned bolt hole on the tow hitch and the diameter of at least one aligned bolt hole on the drawbar, but larger than the diameter of another aligned bolt hole on the drawbar.

17. The spare tire carrier according to claim 1 wherein said lever is positioned and configured for actuation by a foot of a user to release said cinch while maintaining the hands of such user free.

18. The spare tire carrier according to claim 17 wherein said lever includes a foot engagement bar which extends generally parallel to said vehicle when said carrier is connected thereto.

19. The spare tire carrier according to claim 18 wherein said lever includes a foot engagement bar which has a portion which projects outward of all other structure of said carrier adjacent thereto to permit access to said lever by a user's foot.

20. The spare tire carrier of claim 1 further including a coupler for connecting said carrier to said hitch receiver, said coupler comprising:

a drawbar configured to telescope within said hitch receiver so that an exterior surface of the drawbar overlaps an interior surface of the hitch receiver to provide opposed overlapping surfaces, said drawbar having at least one bolt hole and said hitch receiver having at least one bolt hole, the relative locations of the bolt holes being such that when the drawbar is telescoped within the hitch receiver at least one telescoped position exists in which the bolt hole in the hitch receiver is aligned with the bolt hole in the drawbar, and the diameter of the aligned bolt hole on the drawbar being smaller than the diameter of a corresponding aligned bolt hole on the hitch receiver; and a tightener which applies force to maintain the overlapping surfaces together.

21. The spare tire carrier of claim 20 wherein the tightener comprises:

a tail whose diameter is smaller than the diameters of all aligned bolt holes on the drawbar and the hitch receiver;

a midsection located between a shoulder and the tail whose diameter is smaller than the diameters of all aligned bolt holes on the drawbar and the hitch receiver;

a shoulder wherein the shoulder's diameter is larger than that of the midsection; and a head that is attached to the shoulder.

* * * * *